United States Patent [19]

Hirooka et al.

[11] 3,983,058

[45] Sept. 28, 1976

[54] PROCESS FOR PREPARING POLYURETHANE EMULSIONS

[75] Inventors: Masaaki Hirooka; Shigeru Takeo, both of Tokyo, Japan

[73] Assignee: Hodogaya Chemical Co., Ltd., Tokyo, Japan

[22] Filed: Oct. 25, 1974

[21] Appl. No.: 518,074

[52] U.S. Cl. .................. 260/29.2 TN; 260/18 TN; 260/75 NP; 260/77.5 AM
[51] Int. Cl.² .......................................... C08L 75/06
[58] Field of Search .............. 260/29.2 TN, 75 TN, 260/75 NK, 75 NP, 77.5 AP, 77.5 MA, 18 TN

[56] References Cited

UNITED STATES PATENTS

| | | |
|---|---|---|
| 3,522,199 | 7/1970 | Keberle et al. ............... 260/29.2 TN |
| 3,773,729 | 11/1973 | Wakimoto et al. ............. 260/75 NK |

*Primary Examiner*—J. Ziegler
*Attorney, Agent, or Firm*—Oblon, Fisher, Spivak, McClelland & Maier

[57] ABSTRACT

Polyurethane emulsions are prepared by reacting a semi-ester containing at least one hydroxyl group and at least one carboxyl group which is produced from a polyhydroxyl compound and an acid anhydride with a polyisocyanate compound having at least two NCO groups which forms said polyurethane emulsion.

9 Claims, No Drawings

PROCESS FOR PREPARING POLYURETHANE EMULSIONS

BACKGROUND OF THE INVENTION

1. Field of the Invention

The present invention relates to a process for preparing a polyurethane emulsion.

2. Description of the Prior Art

Various polyurethane emulsions have been proposed and have been used in various applications such as coating agents, binders, impregnating agents and the like because of their excellent characteristics. Recently, polyurethane emulsions have been used in civil engineering fields as coagulants, soil stabilizers and the like. However, in the preparation of polyurethane emulsions, polyurethane compounds are usually hydrophobic and thus it is impossible to form stable emulsions by uniformly dispersing the polyurethane compounds in water. Accordingly, it has been proposed (I) to use a surfactant in the emulsion system or (II) to introduce a hydrophilic group into the polyurethane molecule in order to easily disperse the polyurethane molecules in water. When method (I) has been used, only unstable emulsions have been obtained.

The following methods are prior art techniques which use the procedure of method (II): U.S. Pat. No. 3,479,310 and Japanese Patent Publication No. 9076/1968 show a method of forming stable polyurethane emulsions by introducing a hydrophilic group into a polyurethane molecule. Japanese Patent Publication No. 27904/1969 shows a method of introducing a salt forming group in a polyurethane molecule by forming a microgel of polyurethane. Japanese Patent Publication No. 27349/1965 shows a method of dispersing a polyurethane having tertiary amino nitrogen atoms in an acidic solution. U.S. Pat. No. 3,412,054 shows a method of introducing a carboxyl group into a polyurethane molecule by using a compound having the formula

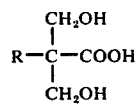

which is prepared by oxidizing an aldehyde. In all of these methods, there are various difficulties which arise during the preparations. For example, oxymonocarboxylic acids such as lactic acid, glycolic acid, α-oxypropionic acid, and β-oxypropionic acid are thermally unstable so that they easily dehydrate in the reaction between a hydroxyl group and an isocyanato group. Oxypolycarboxylic acids such as oxymalonic acid, malic acid, tartaric acid and citric acid each have a melting point higher than 130°C and are easily decomposed upon heating to generate carbon dioxide gas. The mutual miscibility of an oxypolycarboxylic acid and a polyisocyanate is usually not very good. It is hard to introduce a carboxyl group into the polyisocyanate component by reacting it stoichiometrically with the polyisocyanate. A carboxylic acid such as salicylic acid or resorcinol carboxylic acid has a phenolic hydroxyl group. In order to introduce the carboxylic group into the polyisocyanate, it is necessary to react the isocyanato group with a phenolic hydroxyl group at a temperature higher than 100°C. At these temperatures, the reaction of a carboxyl group with the isocyanato group also abnormally increases the viscosity thereof or solidifies the product. Moreover, in order to introduce a carboxyl group into the polyisocyanate with a polycarboxylic acid such as isophthalic acid or maleic acid, the carboxyl group reacts with the isocyanato group to eliminate carbon dioxide gas at a temperature higher than 130°C, which greatly increases the viscosity and in many cases, causes solidification. It is clear from what is known about the reaction that the introduction of a carboxyl group into the polyisocyanate component is very difficult when applied to the preparation of polyurethane emulsions.

The carboxylic acid modified isocyanates are usually high viscosity products. If a large amount of an organic solvent is used to dilute the product, it may be possible to form an aqueous dispersed state. However, serious toxicity and fire problems arise. Many different molecules having nitrogen atoms in the polyisocyanate component have been proposed to form emulsions of cationic type polyurethanes. These products have been produced by reaction of an isocyanate and a nitrogen atom containing compound. The products still present various industrial difficulties in that the reaction is very fast, control of the reaction is difficult and side-reactions easily occur. Also, the increase of viscosity is substantial, large amounts of solvent have to be added, and storage stability is poor.

A need therefore continues to exist for an improved method for preparing polyurethane emulsions.

SUMMARY OF THE INVENTION

Accordingly, one object of the present invention is to provide a process for preparing a polyurethane emulsion without industrial difficulties.

Briefly, this object and other objects of the invention as hereinafter will become more readily apparent can be attained by a process for preparing a polyurethane emulsion by reaction a semi-ester containing at least one hydroxyl group and at least one carboxyl group which is produced from a polyhydroxy compound and an acid anhydride with a polyisocyanate compound having at least two NCO groups.

DETAILED DESCRIPTION OF THE PREFERRED EMBODIMENTS

In one embodiment of the process of the present invention a polyisocyanate containing a carboxyl group and at least two NCO groups (produced by reacting the hydroxyl group of a specific semi-ester with a polyisocyanate and hereinafter referred to as a specific carboxyl modified polyisocyanate) is dispersed in an aqueous alkaline solution. In another embodiment of the process of the invention a mixture of a specific semi-ester and a polyisocyanate (the mixture is not an adduct of the hydroxyl group of the specific semi-ester with the polyisocyanate) is dispersed in an aqueous alkaline solution. In yet another embodiment of the process of the invention a specific semi-ester is dissolved or dispersed in an alkaline solution and then a polyisocyanate is dispersed in the solution whereby the hydroxyl group of the specific semi-ester or water is reacted with the isocyanate in an emulsion to form the polyurethane emulsion.

The functional groups of the hydroxyl group and the carboxyl group in the specific semi-ester can be readily selected depending upon the combination of the polyhydroxyl compound and the acid anhydride desired.

The molecular weight and the type of the specific semi-ester can be easily selected depending upon the properties of the resulting polyurethane emulsions desired. The versatility of the present process is advantageous in comparison with the process of U.S. Pat. No. 3,412,054 which uses compounds having the formula

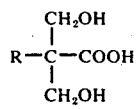

The number of functional groups (hydroxyl groups) of the specific semi-ester can be controlled by the number of functional groups (isocyanato groups) of the polyisocyanate as the number of functional groups (hydroxyl groups) of the specific semi-ester can be easily selected. For example, a specific semi-ester having a monohydroxyl group can be suitably reacted with a polyisocyanate having at least 3 functional groups. Suitable polyhydroxyl compounds used for producing the specific semi-esters include polyhydric alcohols such as ethyleneglycol, butanediol, 1,2-propanediol, neopentylglycol, propyleneglycol, glycerine, trimethylol propane; polyalkylenepolyether polyols produced by the poly-additional reaction of a polyhydric alcohol and an alkyleneoxide such as ethyleneoxide, propyleneoxide, butyleneoxide; and compounds having at least two hydroxyl groups such as castor oil, or mixtures thereof. The molecular weight of the polyhydroxyl compound is preferably less than 3000. If the molecular weight is above 3000, the rate of the semi-esterification with the acid anhydride is too low.

Suitable acid anhydrides used for producing the specific semi-esters include maleic anhydride, phthalic anhydride, succinic anhydride, glutaric anhydride and mixtures thereof.

Suitable polyisocyanates used for reacting with the specific semi-esters include diisocyanates such as tolylene diisocyanate, 4,4'-diphenylmethane diisocyanate, hexamethylene diisocyanate, xylylene diisocyanate; polyisocyanates such as polymethylene polyphenyl isocyanate; and isocyanate prepolymers having at least two NCO groups which are produced by reacting an isocyanate with a polyhydroxyl compound such as polyoxyalkylenepolyol, polyester-polyol; and mixtures thereof.

Suitable alkaline compounds used in the alkaline solutions include inorganic alkaline compounds such as sodium hydroxide, potassium hydroxide, potassium carbonate, sodium bicarbonate; amines such as ethylenediamine, n-butylamine, diethylamine, trimethylamine, monoethanolamine; aminoalcohols and ammonia. Actually, any compound which results in an alkaline solution in water can be used.

In the preparation of the specific semi-esters from the polyhydroxyl compound and the acid anhydride, the polyhydroxyl compound is dehydrated at 100° – 110°C under a pressure of 1–10 mmHg for 2 – 3 hours and then the acid anhydride is added to it at 50° – 70°C. The ratio of the polyhydroxyl compound to the acid anhydride selected is determined by consideration of the number of hydroxyl group equivalents and the number of acid anhydride equivalents. For example, in order to prepare a specific semi-ester containing 1 carboxyl group and 2 hydroxyl groups, 1 mole of glycerine and 1 mole of maleic anhydride are reacted. The reaction is usually preformed at 60° – 130°C for 3 – 10 hours with stirring, preferably at a temperature near the melting point of the acid anhydride. In the reaction, the reaction rate of the acid anhydride and the hydroxyl group is much higher than that of the dehydro-esterification of the free carboxylic acid and the hydroxyl group, and therefore dehydration of the ester does not occur and the specific semi-ester is stoichiometrically produced. The specific semi-esters containing the desired number of hydroxyl groups and carboxyl groups can be prepared by appropriately selecting the ratio of the polyhydroxyl compound and the acid anhydride and the type of compounds thereof.

The urethane reaction in which the hydroxyl group of the specific semi-ester is reacted with the isocyanate group to introduce carboxyl functionality in the polyisocyanate, is usually performed at room temperature to 100°C for 1 – 5 hours under an atmosphere of nitrogen gas at atmospheric pressure, preferably at 70° – 90°C for 2 – 3 hours.

The ratio of the isocyanate component to the specific semi-ester is decided by considering the ratio of NCO-/OH and the carboxyl group content of the polymer. Usually the reaction is conducted under conditions such that NCO/OH $\geq$ 2.0, and the carboxyl group content of the polymer is 0.1 – 3.0% in a batch system with stirring. The carboxyl group content of the polymer is preferably as shown in the following table depending upon the isocyanate content of the prepolymer in the case of the isocyanate prepolymer (containing at least 2 NCO groups at the terminals) produced by reacting an aromatic isocyanate component with a polyoxyalkylenepolyol as the polyhydroxyl compound (NCO/OH $\geq$ 2.0).

TABLE

| NCO (%) | 10 | 8 | 6 | 4 |
|---|---|---|---|---|
| COOH/polymer (%) | $\geq 0.8$ | $\geq 0.7$ | $\geq 0.6$ | $\geq 0.4$ |

On the other hand, it is preferred that the carboxyl group content of the polymer be greater than about 1% in the case when the isocyanate component has an isocyanate group content of 30 – 40% such as tolylene diisocyanate or polymethylenepolyphenyl isocyanate. For example, it is preferred that the ratio of NCO/OH be 4.5 and the carboxyl group content of the polymer be about 0.7% when the polymer is produced using the specific semi-ester (produced from equimolar amounts of polyoxypropylenetriol having a molecular weight of 400 and maleic anhydride) and an isocyanate prepolymer having a 6% NCO group content (produced from 1 mole of polypropylenepolyether glycol having a molecular weight of 1000 and 2 moles of tolylene diisocyanate).

The specific semi-ester can be used as a surfactant for reaction with the polyisocyanate component in an aqueous dispersion to prepare the polyurethane emulsion. In this case, the polyisocyanate component, the specific semi-ester component and the alkaline component and water can be similar to those components used in the preparation of the emulsion by using the carboxyl modified polyisocyanate. In the case of an aliphatic isocyanate, it is preferable to have a carboxyl group content of about 10 – 20% less than that of the aromatic isocyanate.

The dispersal of the carboxyl modified polyisocyanate can be performed by conventional emulsification procedures using an emulsifier or a stirrer, preferably a forcible emulsifier such as a homogenizer or a colloid mill, to prepare a stable emulsion. The amount of the polymer (dispersed phase) to the dispersing alkaline solution medium (emulsion concentration) can be quite low such as concentrations less than 75%, preferably 30 – 50%. In the dispersion of the carboxyl modified polyisocyanate, especially in media having a relatively high viscosity such as one produced from a tolylene diisocyanate prepolymer having an NCO group content of 12% or polymethylenepolyphenyl isocyanate, the carboxyl modified polyisocyanate at 70° – 90°C is easily emulsified in the alkaline solution at 30° – 40°C. Usually the carboxyl modified polyisocyanate is emulsified at room temperature to 50°C in the alkaline solution at room temperature. The carboxyl modified polyisocyanate can be added at once to the alkaline solution. However, it is preferable to add the isocyanate dropwise when the NCO group content of the carboxyl modified polyisocyanate is greater than 15%. For example, it is possible to achieve good results by adding the carboxyl modified isocyanate having an NCO group content of 18% [blend of tolylene diisocyanate and an isocyanate prepolymer (1 mole of polypropylenepolyether glycol of a molecular weight of 2000 and 2 moles of tolylene diisocyanate having an NCO group content of 4%)] over a period of 1–2 hours. The amount of the alkaline compound in the alkaline solution is decided depending upon the number of equivalents of the carboxyl group in the polymer emulsified. The ratio of the base equivalents to the carboxyl groups is usually 2/1 – 1/4, preferably 1/1 – 1/3.

In the preparation of the carboxyl modified polyisocyanate, it is possible to react the three components, i.e., the specific semi-ester, the polyhydroxyl compound and the polyisocyanate (such as tolylene diisocyanate), without preparing the isocyanate prepolymer. In accordance with the invention, the polyurethane emulsion can be easily prepared in industrial operations. Moreover, the resulting polyurethane emulsion is stable at 20°C for 1 year and in a non-vulcanized form resulting in an emulsion having various excellent properties.

The applications of the polyurethane emulsion can be in paints, as coating agents for cloth, paper, leather, wood, metal, or as impregnants, as binders, as adhesive agents, as tackifiers, as immersed products, as casting products, and the like.

Having generally described this invention, a further understanding can be obtained by reference to certain specific examples which are provided herein for purpose of illustration only and are not intended to be limiting unless otherwise specified.

Preparation of Semi-Ester 1

Four hundred parts by weight of the polypropylenepolyether triol having an average molecular weight of 400 and an OH value of 420 (produced by reacting propyleneoxide with the 3 hydroxyl groups of glycerine) was dehydrated at 105°C under a pressure of 1 mmHg for 2 hours. The product was cooled to 60°C and 98 parts by wt of maleic anhydride was added at once to it. The mixture was stirred for 1 hour under a nitrogen atmosphere until the solid components were dissolved and melted. The mixture was then heated to 70°C to react the components and until the acid value reached a constant level. The resulting semi-ester was a pale yellow transparent liquid having an OH value of 225, an acid value of 113, an average molecular weight of 498 and a viscosity of 1500 cps/25°C.

Preparation of Semi-Ester 2

In accordance with the process of preparation 1, a specific semi-ester was produced in the same manner except that 200 parts by wt of polypropylene-polyetherglycol having an average molecular weight of 2000 and an OH value of 56.1 were reacted with 9.8 parts by wt of maleic anhydride. The resulting semi-ester was a pale yellow transparent liquid having an OH value of 26.8, an acid value of 26.8 and a viscosity of 500 cps/25°C.

Preparation of Semi-Ester 3

In accordance with the process of preparation 1, a specific semi-ester was produced in the same manner except that 400 parts by wt of polypropylene-polyetherglycol having an average molecular weight of 400 and an OH value of 280 were reacted with 114 wt. parts of glutaric anhydride. The resulting semi-ester was a colorless transparent liquid having an OH value of 109, an acid value of 109 and a viscosity of 1200 cps/25°C.

Preparation of Semi-Ester 4

In accordance with the process of preparation 1, a specific semi-ester was prepared in the same manner except that 184 parts by wt of glycerine were reacted with 228 parts by wt of glutaric anhydride. The resulting semi-ester was a colorless transparent liquid having an OH value of 272 and an acid value of 136.

Preparation of Semi-Ester 5

In accordance with the process of preparation 1, a specific semi-ester was prepared in the same manner except that 1050 parts by wt of castor oil having an OH value of 160 were reacted with 196 parts by wt of maleic anhydride. The resulting semi-ester was a yellow transparent liquid having an OH value of 45 and an acid value of 90.

Preparation of Semi-Ester 6

In accordance with the process of preparation 1, a specific semi-ester was prepared in the same manner except that 150 parts by wt of polyethylene-polyether triol having an average molecular weight of 1500 and an OH value of 112 (produced by reacting ethylene oxide with the hydroxyl groups of glycerine) were reacted with 10 parts by wt of succinic anhydride at 120°C. The resulting semi-ester was a pale yellow transparent liquid having an OH value of 70 and an acid value of 35.

Preparation of Semi-Ester 7

In accordance with the process of preparation 1, a specific semi-ester was prepared in the same manner except that 300 parts by wt of polypropylene-polyether triol having an average molecular weight of 3000 and an OH value of 56.1 (produced by reacting ethylene and propyleneoxide with the hydroxyl groups of glycerine in a ratio of 1:1) were reacted with 14.8 parts by wt of phthalic anhydride at 135°C. The resulting semi-ester was a colorless viscous liquid having an OH value of 35.6 and an acid value of 17.8.

EXAMPLE 1

Four hundred parts by wt of polypropylenepolyether glycol having an average molecular weight of 400 and an OH value of 280 were dehydrated at 105°C under the reduced pressure of 1 mmHg for 2 hours. The product was cooled to 40°C, and 348 parts by wt of tolylenediisocyanate was gradually added to the product, and then the mixture was kept at about 50°C for 1 hours and at 70°C for 3 hours to react the components to give a bifunctional isocyanate prepolymer having an average molecular weight of 748 and an NCO content of 10.7%. An amount of 92.5 parts by wt of the specific semi-ester of preparation 4 was added to the bifunctional isocyanate prepolymer and the components were reacted at 80°C for 3 hours under a nitrogen gas atmosphere to give a carboxyl modified isocyanate having a COOH content of 1.2% and an NCO content of 7.2%. The polymer was kept at 80°C and was poured into 1260 parts by wt of an aqueous solution containing 4.5 parts by wt of sodium hydroxide while being stirred in a homomixer. The mixture was further stirred for 15 min. whereby a polyurethane emulsion was prepared by generating $CO_2$ gas. After 2 – 3 days, the generation of $CO_2$ gas was stopped. The resulting milky emulsion had a viscosity of 6.9 cps/25°C and a solids content of 40.0 wt. %. The film prepared by using the emulsion was a strong membrane having a pencil hardness of H and had excellent water and oil resistance.

EXAMPLE 2

In accordance with the process of Example 1, a bifunctional isocyanate prepolymer having an NCO content of 8.1% and an average molecular weight of 1048 was produced except that 700 parts by wt of polypropylene-polyether glycol having an average molecular weight of 700 and an OH value of 160 was reacted with 348 parts by wt of tolylene diisocyanate. An amount of 104.8 parts by wt of the specific semi-ester of preparation 1 was added to the bifunctional isocyanate prepolymer. The components were reacted at 70°C for 3 hours under a nitrogen atmosphere to give a carboxyl modified isocyanate having a COOH content of 0.78% and an NCO content of 5.83%. The polymer was kept at 60°C and was poured into 1730 parts by wt of an aqueous solution containing 4.0 parts by wt of sodium hydroxide while stirring with a homomixer to emulsify the mixture. The resulting milky emulsion had a viscosity of 7.5 cps/25°C, a solids content of 40.0 wt % and a pH of 5.7. The properties of the film prepared using the emulsion were as follows.

| Film Properties*[1] | |
| --- | --- |
| 100% modulus | 92 kg/cm$^2$ |
| 300% modulus | 173 kg/cm$^2$ |
| Breaking strength (elongation 420%) | 306 kg/cm$^2$ |
| Dipping in water (at 25°C for 7 days) | 10.5% weight increase |
| *[2]Dipping in gasoline (at 25°C for 7 days) | 9.5% weight increase |

*[1]ASTM D412-61T
*[2]ASTM D471-57T
Thickness of film = 0.5–0.8 mm.

The film was prepared by using the emulsion kept at 20°C in a 75% humidity for 7 days.

EXAMPLE 3

In accordance with the process of Example 1, a carboxyl modified isocyanate polymer was produced except that 100 parts by wt of a prepolymer having an NCO content of 19.7% (produced by reacting 1 mole of trimethylolpropane with 3 moles of hexamethylenediisocyanate) were reacted with 12.9 parts by wt of the specific semi-ester of preparation 3. The carboxyl modified isocyanate polymer was kept at 80°C and was poured into 167 parts by wt of an aqueous solution containing 0.7 parts by wt of sodium hydroxide while stirring in a homomixer to emulsify the mixture. A milky emulsion was prepared.

EXAMPLE 4

In accordance with the process of Example 1, a carboxyl modified isocyanate polymer was produced except that 200 parts by wt of polypropylenepolyether glycol having an average molecular weight of 2000 and an OH value of 56.1 were reacted with 34.8 parts by wt of tolylenediisocyanate. The isocyonate prepolymer was reacted with 4.4 parts by wt of the specific semi-ester of preparation 4. The resulting polymer was kept at 60°C and was poured into 358 parts by wt of an aqueous solution containing 0.4 parts by wt of sodium hydroxide while stirring in a homomixer to emulsify the mixture. The resulting emulsion was milky, and had a pH of 7.0 and a solids content of 41.5%. The film prepared with the emulsion had a tensile strength of 42.5 kg/cm$^2$ and an elongation of 1200%. The film was prepared with the emulsion kept at 20°C in a humidity of 75% for 10 days, and the properties were measured. In the following Examples, the same film treatment conditions were used.

EXAMPLE 5

In accordance with the process of Example 1, a carboxyl modified isocyanate polymer was produced except that 300 parts by wt of polypropylenepolyether triol having an average molecular weight of 3000 and an OH value of 56.1 were reacted with 34.8 parts by wt of tolylene diisocyanate. The isocyanate prepolymer was reacted with 29.1 parts by wt of the specific semi-ester of preparation 3. The resulting polymer had an NCO content of 2.76% and a COOH content of 0.74%. The polymer was kept at 70°C and was poured into 536 parts by wt of an aqueous solution containing 1.12 parts by wt of sodium hydroxide while stirring in a homomixer to emulsify the mixture. The resulting emulsion was milky and had a solids content of 40.5%. The film prepared with the emulsion was tacky and had a tensile strength of 38.5 kg/cm$^2$ and an elongation of 300%.

EXAMPLE 6

In accordance with the process of Example 1, a carboxyl modified isocyanate polymer was produced except that 70 parts by wt of a mixture of castor oil having an OH value of 160 and the polyol having an average molecular weight of 700 used in Example 2 (1 : 1) were reacted with 34.8 parts by wt of tolylenediisocyanate. The isocyanate prepolymer was reacted with 15 parts by wt of the specific semi-ester of Example 1. The polymer had an NCO content of 3.56%, and a COOH content of 1.13%. The polymer was kept at 70°C and poured into 180 parts by wt of an aqueous solution containing 0.6 parts by wt of sodium hydroxide, while stirring in a homomixer to emulsify the mixture. The resulting emulsion was milky and had a solids content of 40.0%. The film prepared with the emulsion had a tensile strength of 62.5 kg/cm$^2$ and an elongation of 100%. When the film was exposed to weather and measured with a weather meter for 300 hours, the film changed slightly to yellow but the strength of the film did not change.

EXAMPLE 7

An amount of 100 parts by wt of polymethylenepolyphenyl isocyanate (NCO content of 30%) was mixed with 60 parts by wt of the semi-ester of preparation 2 and 20 parts by wt of the semi-ester of preparation 6. The reaction was conducted at 50°C for 3 hours under a nitrogen gas atmosphere to give a carboxyl modified isocyanate polymer having an NCO content of 15.2% and a COOH content of 1.05%. The polymer was kept at 80°C and was poured into 270 parts by wt of an aqueous solution containing 0.8 parts by wt of sodium hydroxide while stirring in a homomixer to emulsify the mixture. The film prepared with the resulting milky emulsion was not tacky and had a tensile strength of 250 kg/cm$^2$ and an elongation of 200%.

EXAMPLE 8

An amount of 435 parts by wt of tolylenediisocyanate was mixed with 1574 parts by wt of the semi-ester of preparation 7. The reaction was conducted at 70°C for 3 hours under a nitrogen gas atmosphere to give a carboxyl modified isocyanate polymer having an NCO content of 8.05% and a COOH content of 1.12%. The polymer was kept at 70°C and was poured into 5000 parts by wt of an aqueous solution containing 10 parts by wt of sodium hydroxide while stirring in a homomixer to emulsify the mixture. The film prepared with the resulting milky emulsion was not tacky and had a tensile strength of 280 kg/cm$^2$ and an elongation of 380%.

EXAMPLE 9

An amount of 40 parts by wt of polymethylenepolyphenyl isocyanate (NCO content of 30%) and 60 parts by wt of bifunctional isocyanate prepolymer of Example 3 (average molecular weight of 2348 terminal isocyanate) were mixed with 25 parts by wt of the semi-ester of preparation 5. The reaction was conducted at 70°C for 3 hours under a nitrogen gas atmosphere to give a carboxyl modified isocyanate polymer having an NCO content of 10.4%. The polymer was kept at 70°C and was poured into 185 parts by wt of an aqueous solution containing 0.47 parts by wt of ammonia while stirring in a homomixer to emulsify the mixture. The film prepared with the resulting milky emulsion had a tensile strength of 185 kg/cm$^2$ and an elongation of 130% and was a rigid membrane. Even though the film was kept at 100°C for 5 days, the tensile strength of the film did not change.

EXAMPLE 10

An amount of 60 parts by wt of the semi-ester of the preparation 2 and 20 parts by wt of the semi-ester of preparation 6 were mixed with 100 parts by wt of polymethylenepolyphenyl isocyanate (NCO content of 30%). The mixture was poured in 270 parts by wt of an aqueous solution containing 0.8 parts by wt of sodium hydroxide while stirring in a homomixer to emulsify the mixture to give a pale brown polyurethane emulsion.

EXAMPLE 11

An amount of 104.8 parts by wt of the semi-ester of Example 1 was dispersed and dissolved in 1730 parts by wt of an aqueous solution containing 4.0 parts by wt of sodium hydroxide. A bifunctional isocyanate prepolymer having an NCO content of 8.1% and an average molecular weight of 1048 (tolylenediisocyanate prepolymer which was produced from polypropylenepolyether glycol and tolylenediisocyanate) was poured into the solution heated at 30°C while stirring in a homomixer to emulsify the mixture to give a milky polyurethene emulsion.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing a polyurethane emulsion which comprises:
   reacting a semi-ester containing at least one OH group and at least one COOH group, which is produced by addition reaction of a poly-OH compound having two or more OH groups with a dicarboxylic acid anhydride, with a polyisocyanate compound having at least two NCO groups or an isocyanate prepolymer having at least two NCO groups produced by a reaction of said polyisocyanate compound with a polyoxy-alkylenepolyol or polyesterpolyol, wherein the ratio of the number of NCO groups in the polyisocyanate compound to the number of OH groups in the semi-ester compound is $\geq 2.0$, whereby there is obtained an isocyanate compound containing a COOH group and at least two terminal NCO groups.

2. The process of claim 1, wherein a mixture of the semi-ester and the polyisocyanate compound is dispersed in an aqueous solution.

3. The process of claim 1, wherein the semi-ester is dispersed or dissolved in an alkaline solution and then the polyisocyanate compound is dispersed in the solution.

4. The process of claim 1, wherein the semi-ester is produced by reacting maleic, phthalic, glutaric or succinic anhydride with polypropylenepolyether glycol, glycerine, an adduct of glycerine and ethyleneoxide, an adduct of glycerine and propyleneoxide, an adduct of glycerine and ethylene and propylene oxide, or castor oil.

5. The process for preparing a polyurethane emulsion of claim 1, wherein said semi-ester compound is produced by addition reaction of said polyhydroxyl compound with maleic anhydride, phthalic anhydride, glutaric anhydride or succinic anhydride by ring opening of said anhydride.

6. The process for preparing a polyurethane emulsion of claim 1, wherein said semi-ester compound is produced by addition reaction of glycerine, polyoxyalkylenepolyol having an average molecular weight of less than 3000 or castor oil with maleic anhydride, phthalic anhydride, glutaric anhydride or succinic anhydride by ring opening of said anhydride.

7. The process for preparing a polyurethane emulsion of claim 1, wherein said isocyanate compound containing a COOH group is produced by reacting said semi-ester with a polyisocyanate compound having at least two NCO groups selected from the group consisting of aromatic or aliphatic diisocyanate compounds and polymethylene polyphenylisocyanates, or an isocyanate prepolymer having at least two NCO groups which is produced by reacting said polyisocyanate compound with trimethylolpropane, polyoxyalkylenepolyol having an average molecular weight of less than 3000 or castor oil.

8. The process for preparing a polyurethane emulsion of claim 1, wherein the COOH group-content of the COOH-containing isocyanate compound is in the range of 0.1 – 3.0%.

9. A polyurethane emulsion, which comprises an alkaline aqueous dispersion of the reaction product of claim 1.

* * * * *